US012738979B2

(12) United States Patent
Yadav et al.

(10) Patent No.: US 12,738,979 B2
(45) Date of Patent: Sep. 15, 2026

(54) LEARNING BASED DYNAMIC CLUSTERING FOR COORDINATED MULTIPOINT TRANSMISSION IN COMMUNICATION NETWORKS

(71) Applicant: Tata Consultancy Services Limited, Mumbai (IN)

(72) Inventors: Indu Yadav, Bangalore (IN); Hemant Kumar Rath, Bhubaneswar (IN); Garima Mishra, Bangalore (IN); Muralidharan Sadanand Menon, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 342 days.

(21) Appl. No.: 18/665,732

(22) Filed: May 16, 2024

(65) Prior Publication Data

US 2024/0388324 A1 Nov. 21, 2024

(30) Foreign Application Priority Data

May 17, 2023 (IN) ............................ 202321009789

(51) Int. Cl.
*H04B 7/024* (2017.01)
*H04W 72/0446* (2023.01)
*H04W 72/21* (2023.01)

(52) U.S. Cl.
CPC ........ *H04B 7/024* (2013.01); *H04W 72/0446* (2013.01); *H04W 72/21* (2023.01)

(58) Field of Classification Search
CPC . H04B 7/024; H04B 7/0626; H04W 72/0446; H04W 72/21; G06N 20/00; G06N 3/09; H04J 11/0053
See application file for complete search history.

(56) References Cited

U.S. PATENT DOCUMENTS

2011/0237272 A1* 9/2011 Gorokhov ............ H04J 11/0053 455/422.1
2012/0135771 A1* 5/2012 Futaki .................. H04L 5/0023 455/517
2016/0182198 A1* 6/2016 Won ...................... H04L 5/0035 370/329

OTHER PUBLICATIONS

"Dynamic Cell Clustering Design for Realistic Coordinated Multipoint Downlink Transmission", IEEE Xplore, 2011, 5 pages (Year: 2011).*

(Continued)

*Primary Examiner* — Quoc Thai N Vu
(74) *Attorney, Agent, or Firm* — FINNEGAN, HENDERSON, FARABOW, GARRETT & DUNNER LLP

(57) ABSTRACT

Coordinated Multipoint (CoMP) transmission is a potential candidate to optimize the performance of a network with added flexibility to serve a UE from multiple Base Stations (BSs). However, the performance gain in CoMP is as good as the dynamic clustering. The existing approaches are applicable for a fixed cluster size, which does not capture time-varying channel conditions and the cost of transmission. Embodiments herein provide a method and system for a learning based dynamic clustering of BSs for a CoMP transmission in communication networks. Herein, a framework for the CoMP transmission in 5th Generation (5G) and beyond networks is disclosed. Further, an optimal user-centric dynamic clustering technique is disclosed for the CoMP with the aim of maximizing the throughput subject to the constraint on the cost of transmission from the CoMP cluster i.e., coordinating set of BSs.

18 Claims, 6 Drawing Sheets

(56) References Cited

OTHER PUBLICATIONS

Hu et al., "Scalable Multi-agent Reinforcement Learning Algorithm for Wireless Networks," (2021).
Ioannou et al., "A Distributed AI/ML Framework for D2D Transmission Mode Selection in 5G and Beyond," (2022).
Mumtaz et al., "Dual Connectivity-Based Mobility Management and Data Split Mechanism in 4G/5G Cellular Networks," (2020).
Yin et al., "Decentralized Federated Reinforcement Learning for User-Centric Dynamic TFDD Control," (2022).

* cited by examiner

LEARNING BASED DYNAMIC CLUSTERING FOR COORDINATED MULTIPOINT TRANSMISSION IN COMMUNICATION NETWORKS

CROSS-REFERENCE TO RELATED APPLICATIONS AND PRIORITY

This U.S. patent application claims priority under 35 U.S.C. § 119 to Indian application number 202321009789, filed on May 17, 2023. The entire contents of the aforementioned application are incorporated herein by reference.

TECHNICAL FIELD

The disclosure herein generally relates to the field of coordinated multipoint transmission and more particularly, to a method and system for a learning based dynamic clustering of base stations for a coordinated multipoint (CoMP) transmission in communication networks.

BACKGROUND

The advancements in technologies signaled a paradigm shift in wireless communication networks, with emphasis on diversifying supported applications and use cases. In fifth generation (5G) and beyond networks, the diversity of applications is broadly categorized under three services namely, Massive Machine Type Communication (mMTC), Enhanced Mobile Broadband (eMBB) and ultra-Reliable Low Latency Communication (uRLLC). These applications are expected to have stringent requirements of throughput, latency, reliability, energy, spectral efficiency, and so on. The prominent features of the diversity of services in 5G and beyond networks impresses the need of flexible and coordinated networks. Coordinated MultiPoint (CoMP) transmission is one of the potential techniques to establish coordination.

Primarily, the CoMP transmission has been introduced by a Third Generation Partnership Project (3GPP) in Rel-11 to enhance the performance of cell edge User Equipments (UEs) by mitigating the interference experienced by the edge UEs from neighboring Base Stations (BSs). Further, enhancements in CoMP operations have been proposed in 3GPP Rel-15 and Rel-16 to make it suitable to accommodate the diverse requirements of the future networks.

In time varying scenarios such as a network where the parameters are not static, the dynamic solutions turn out to be more effective and capable of responding to the changing network conditions. This triggers the need of dynamic clustering to exploit the full potential of CoMP in a network.

However, major issues with the dynamic clustering schemes proposed so far is that most of the clustering schemes are applicable for a fixed cluster size, which does not capture dynamic channel conditions and cost of transmission. This means a UE remains connected to all the BSs in a cluster, even if a subset of the BSs is able to deliver the desired performance. Thus, the fixed cluster size may not always be cost efficient solution. In addition, the proposed approaches also lack the scalability feature. Another important challenge is the knowledge of the changing dynamics of channel conditions, which is in general assumed while devising the dynamic clustering scheme.

SUMMARY

Embodiments of the disclosure present technological improvements as solutions to one or more of the abovementioned technical problems recognized by the inventors in conventional systems. For example, in one embodiment, a method and system for a learning based dynamic clustering of base stations for a coordinated multipoint (CoMP) transmission in communication networks is provided.

In one aspect, a processor-implemented method for a learning based dynamic clustering of base stations for a coordinated multipoint transmission in communication networks is provided. The processor-implemented method comprises collection of information related to network deployment and one or more parameters vis an input/output interface at a predefined time interval from communication network. Further, the processor-implemented method includes pre-processing, via one or more hardware processors, the collected information related to the network deployment and one or more parameters.

Furthermore, the processor-implemented method includes receiving, via one or more hardware processors, a channel state information (CSI) from at least one user equipment at the communication network at a beginning of each time slot and determining a cluster state associated with each of the plurality of coordinated multipoint user equipment in the communication network by a Reinforcement Learning (RL) technique based on the periodically received channel state information.

Further, the processor-implemented method includes analyzing, via the one or more hardware processors, the determined cluster state at a beginning of each time slot to select an action set, wherein the action set comprising (i) removing one or more base stations from the determined cluster state, or (ii) adding one or more base stations into the cluster state, or (iii) no change in the determined cluster state. Finally, the method includes identifying, via the one or more hardware processors, a set of base stations from the plurality of base stations based on the selected action set for the determined cluster state of the one or more coordinated multipoint user equipments.

In another aspect, a centralized controller for a learning based dynamic clustering of base stations for a coordinated multipoint transmission in communication networks is provided. The centralized controller includes at least one memory storing programmed instructions, one or more Input/Output (I/O) interfaces, and one or more hardware processors operatively coupled to the at least one memory, wherein the one or more hardware processors are configured by the programmed instructions to collect an information related to a network deployment and one or more parameters at each time slot from a communication network. Further, the one or more hardware processors are configured by the programmed instructions to pre-process the collected information related to the network deployment and one or more parameters. Furthermore, the one or more hardware processors are configured by the programmed instructions to receive a channel state information (CSI) from at least one user equipment at the communication network at the beginning of each time slot.

Furthermore, the one or more hardware processors are configured by the programmed instructions to determine a cluster state associated with each of the plurality of coordinated multipoint user equipment in the communication network by a Reinforcement Learning (RL) technique based on the periodically received channel state information. Furthermore, the one or more hardware processors are configured by the programmed instructions to analyze the determined cluster state at a beginning of each time slot to select an action set, wherein the action set comprising (i) removing one or more base stations from the determined cluster state, or (ii) adding one or more base stations into the cluster state, or (iii) no change in the determined cluster state. Finally, the one or more hardware processors are configured by the programmed instructions to identify a set of base stations from the plurality of base stations based on the selected action set for the determined cluster state of the one or more coordinated multipoint user equipments.

In yet another aspect, one or more non-transitory machine-readable information storage mediums are provided comprising one or more instructions, which when executed by one or more hardware processors causes a method for a learning based dynamic clustering of base stations for a coordinated multipoint transmission in communication networks.

The processor-implemented method comprises collection of information related to network deployment and one or more parameters vis an input/output interface at a predefined time interval from communication network. Further, the processor-implemented method includes pre-processing the collected information related to the network deployment and one or more parameters.

Furthermore, the processor-implemented method includes receiving a channel state information (CSI) from at least one user equipment at the communication network at a beginning of each time slot and determining a cluster state associated with each of the plurality of coordinated multipoint user equipment in the communication network by a Reinforcement Learning (RL) technique based on the periodically received channel state information.

Further, the processor-implemented method includes analyzing the determined cluster state at a beginning of each time slot to select an action set, wherein the action set comprising (i) removing one or more base stations from the determined cluster state, or (ii) adding one or more base stations into the cluster state, or (iii) no change in the determined cluster state. Finally, the method includes identifying a set of base stations from the plurality of base stations based on the selected action set for the determined cluster state of the one or more coordinated multipoint user equipments.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
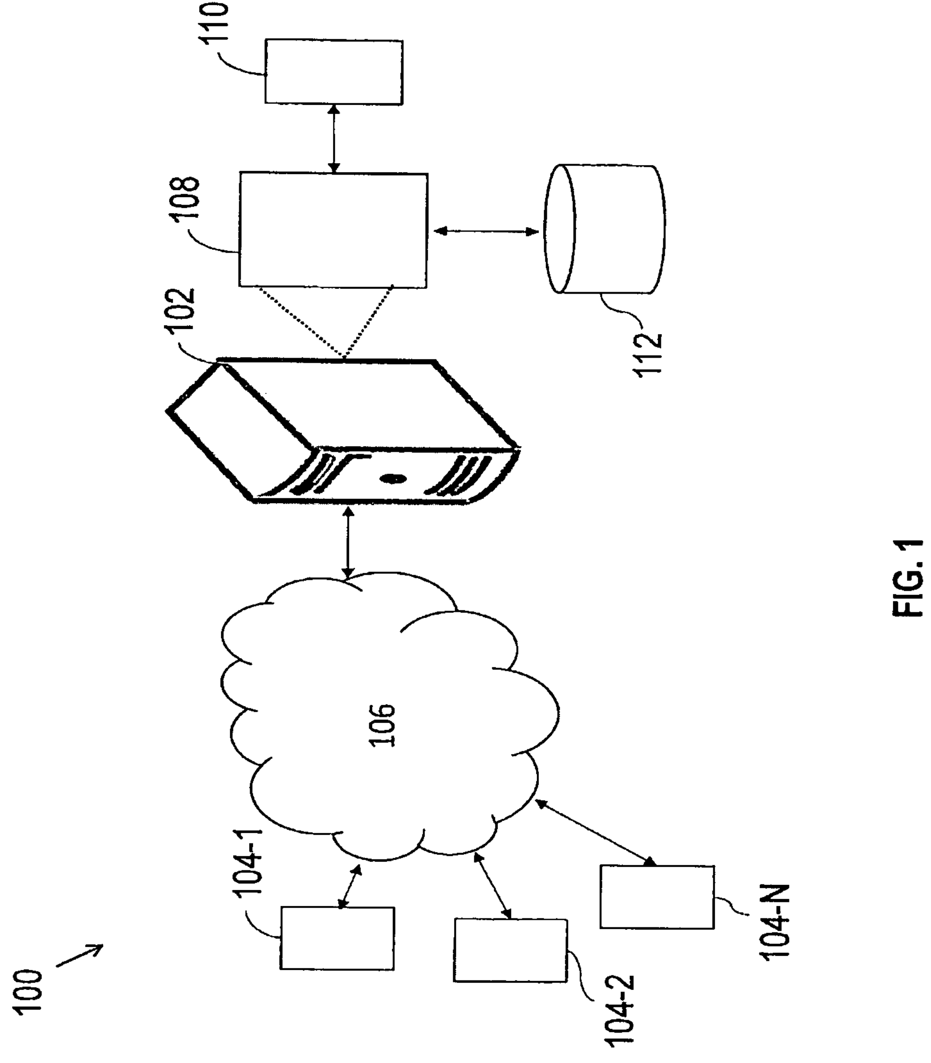
FIG. 1 illustrates a network diagram of a framework for a learning based dynamic clustering of base stations for a coordinated multipoint (CoMP) transmission in communication networks, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

In time varying scenarios such as a network where the parameters are not static, the dynamic solutions turn out to be more effective and capable of responding to the changing network conditions. This triggers the need of dynamic clustering to exploit the full potential of a coordinated multipoint (CoMP) in a communication network.

However, major issues with the dynamic clustering schemes proposed so far is that most of the clustering schemes are applicable for a fixed cluster size, which does not capture dynamic channel conditions and cost of transmission. This means a user equipment (UE) remains connected to all the base stations (BSs) in a cluster, even if a subset of the BSs is able to deliver the desired performance. Thus, the fixed cluster size may not always be cost efficient solution. In addition, the proposed approaches also lack the scalability feature. Another important challenge is the knowledge of the changing dynamics of channel conditions, which is in general assumed while devising the dynamic clustering scheme.

Therefore, embodiments herein provide the method and system for a learning based dynamic clustering of base stations for the CoMP transmission in the communication networks. Herein, a centralized controller for the CoMP transmission in $5^{th}$ Generation (5G) and beyond networks is disclosed. Further, an optimal user-centric dynamic clustering technique is disclosed for the CoMP with the aim of maximizing the throughput, subject to the constraint on the cost of transmission from the CoMP cluster i.e., coordinating set of Base Stations (BSs).

Furthermore, an on-line dynamic clustering technique for the CoMP is disclosed based on a Q-learning approach. The disclosed technique does not require explicit knowledge of the transition probability of the channel state variation for implementation. The extensive simulations are conducted to observe the impact of dynamic clustering in CoMP and the results demonstrate significant performance improvement of the disclosed algorithm which converges to the optimal policy obtained from Relative Value Iteration Algorithm (RVIA).

Referring now to the drawings, and more particularly to FIG. 1 through FIG. 6, where similar reference characters denote corresponding features consistently throughout the figures, there are shown preferred embodiments, and these embodiments are described in the context of the following exemplary system and/or method.

FIG. 1 illustrates a network diagram of a framework 100 for a learning based dynamic clustering of base stations for the CoMP transmission in communication networks. Although the present disclosure is explained considering that the framework 100 is implemented on a server, it may also be present elsewhere such as a local machine. It may be understood that the framework 100 comprises one or more computing devices 102, such as a centralized controller, laptop computer, a desktop computer, a notebook, a workstation, a cloud-based computing environment and the like. It will be understood that the centralized controller 102 may be accessed through one or more input/output interfaces 104-1, 104-2 . . . 104-N, collectively referred to as I/O interface 104. Examples of the I/O interface 104 may include, but are not limited to, a user interface, a portable computer, a personal digital assistant, a handheld device, a smartphone, a tablet computer, a workstation and the like. The I/O interface 104 is communicatively coupled to the centralized controller 102 through a network 106.

In one embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

In another embodiment, the centralized controller 102 further comprises one or more hardware processors 108, one or more memory 110, hereinafter referred as a memory 110 and a data repository 112, for example, a repository 112. The data repository 112 may also be referred to as a dynamic knowledge base 112 or a knowledge base 112. The memory 110 is in communication with the one or more hardware processors 108, wherein the one or more hardware processors 108 are configured to execute programmed instructions stored in the memory 110, to perform various functions as explained in the later part of the disclosure. The repository 112 may store data processed, received, and generated by the system 100. The memory 110 further comprises a plurality of modules. The plurality of modules is configured to perform various functions.

The centralized controller 102 supports various connectivity options such as BLUETOOTH®, USB, ZigBee and other cellular services. The network environment enables connection of various components of the centralized controller 102 using any communication link including Internet, WAN, MAN, and so on. In an exemplary embodiment, the centralized controller 102 is implemented to operate as a stand-alone device. In another embodiment, the centralized controller 102 may be implemented to work as a loosely coupled device to a smart computing environment. The components and functionalities of the centralized controller 102 are described further in detail.

Figure 2:
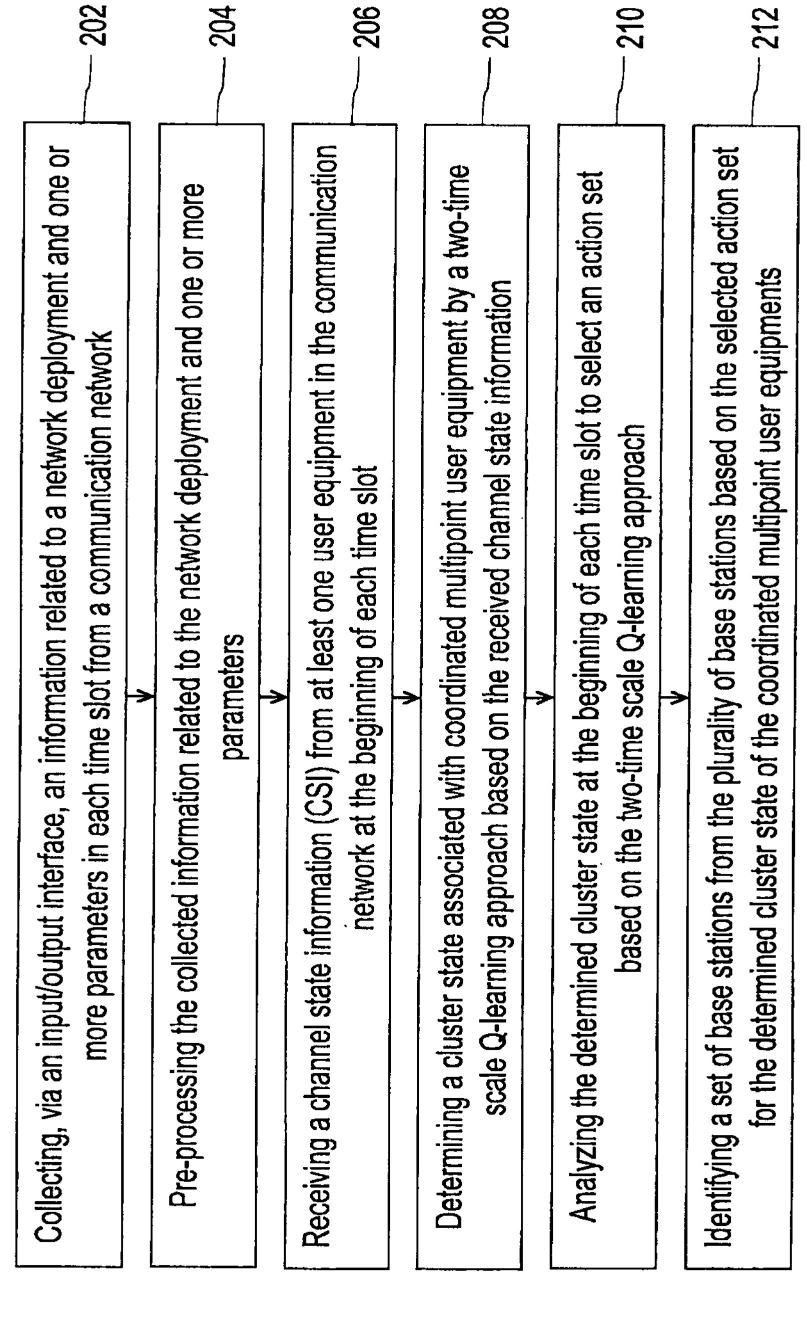
FIG. 2 is an exemplary flow diagram illustrating a method for the learning based dynamic clustering of base stations for the CoMP transmission in the communication networks, in accordance with some embodiments of the present disclosure.

FIG. 2 is an exemplary flow diagram illustrating a processor-implemented method 200 for the learning based dynamic clustering of base stations for the CoMP in communication networks implemented by the framework of FIG. 1, according to some embodiments of the present disclosure. The objective is to determine a dynamic clustering policy which maximizes the average expected total throughput of the CoMP user equipment (UE), subject to the constraint on the average expected cost of transmission.

In the present disclosure, the framework for CoMP transmission in 5G and beyond networks is disclosed. A dynamic clustering problem for CoMP is formulated using an infinite horizon Constraint Markov Decision Process (CMDP) subject to the constraint on cost of transmission. Further, a user centric two time-scale Q-learning approach for dynamic clustering is disclosed, which does not assume the knowledge of transition probability of varying channel state conditions.

Figure 3:
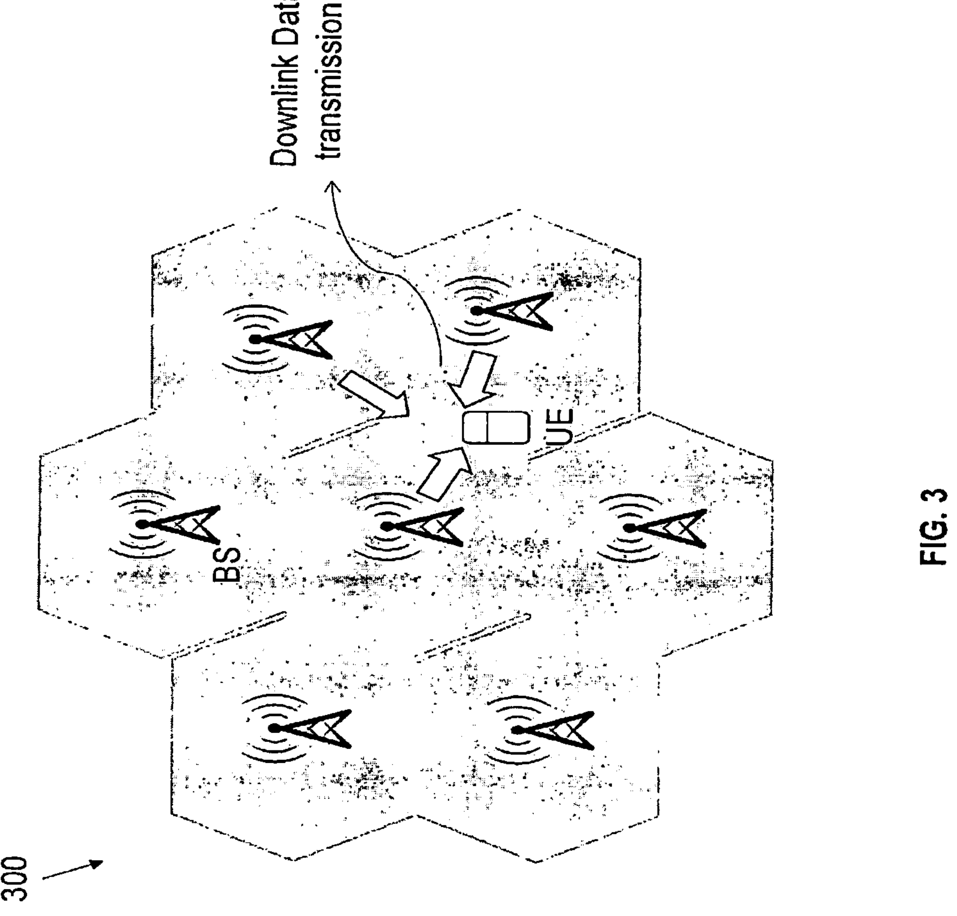
FIG. 3 is a schematic diagram to demonstrate a concept of CoMP transmission in a communication network, in accordance with some embodiments of the present disclosure.

FIG. 3 illustrating the concept of the CoMP communication network 300 implemented by the framework of FIG. 1, according to some embodiments of the present disclosure. Wherein, multiple BSs are transmitting data to a user equipment (UE) simultaneously. The coordination between different BSs jointly transmitting data to the UE is achieved by the CC located at the edge or core of the communication network based on application requirement. For instance, the placement of the CC at the edge is preferred for latency sensitive applications.

Initially at step 202 of the method 200, an information related to the communication network deployment and one or more parameters are received, via an input/output interface 104, at each time slot from a communication network. The one or more entities comprising one or more base stations (BSs), a plurality of user equipments (UEs), a plurality of coordinated multipoint user equipments associated with each of the one or more base stations (BSs), a plurality of legacy user equipments associated with one base station at a time and a channel state information. It is to be noted that the plurality of user equipment is categorized into a legacy user equipment (UE) and a coordinated multipoint (CoMP) user equipment (UE) based on a priority of each user equipment.

The legacy UEs are the users with the normal priority and the CoMP UEs are treated as priority users in the network. To satisfy the stringent quality of service requirements, the CoMP UE can be served from multiple BSs simultaneously, while legacy UEs are always served by one of the BSs (usually the one with which it receives the best signal strength). Further, the CC is a decision making entity which decides upon the set of BSs to coordinate for data transmission to the CoMP UE.

Figure 4:
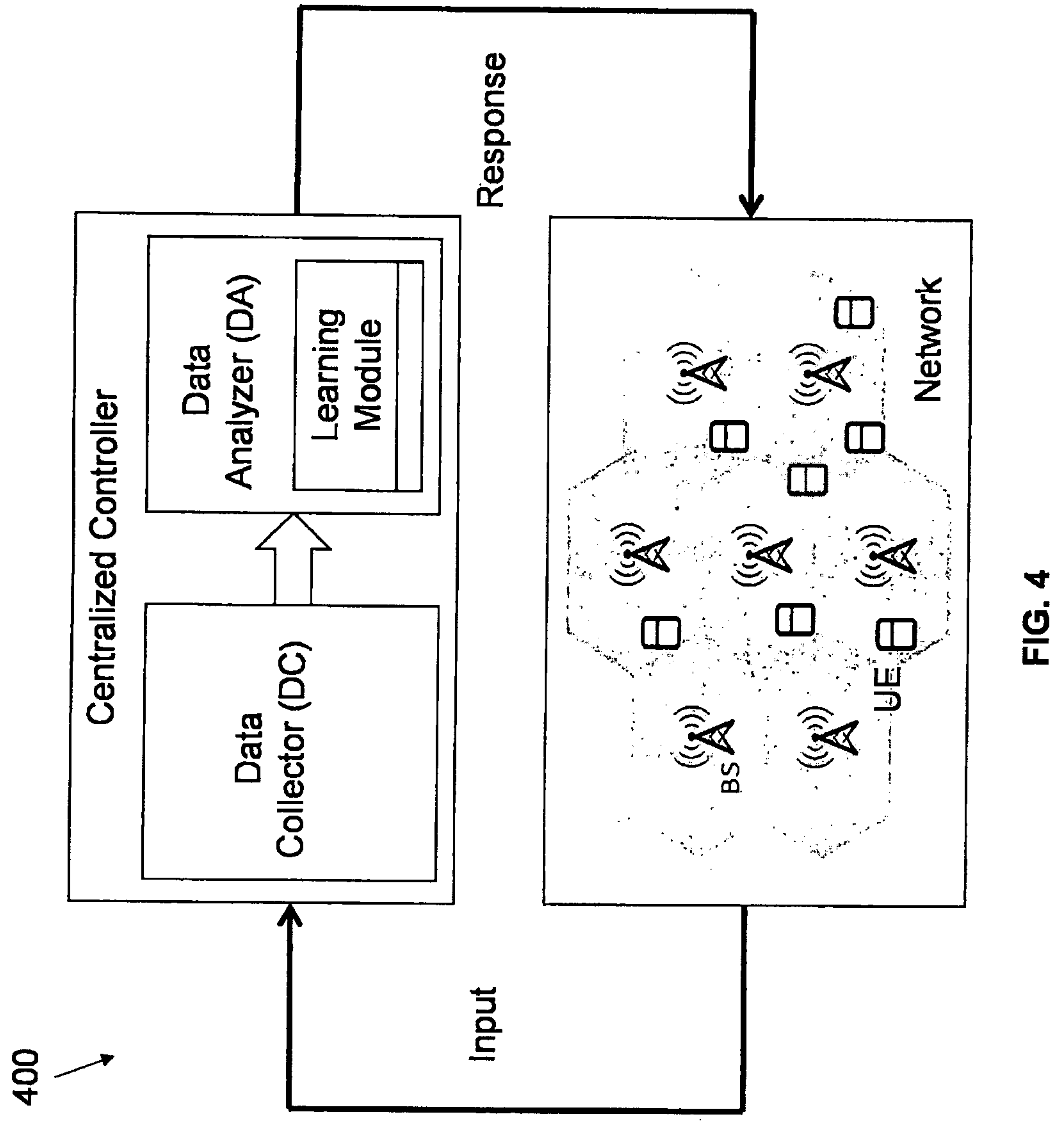
FIG. 4 is a functional block diagram to illustrate the dynamic clustering in the CoMP communication network, in accordance with some embodiments of the present disclosure.

FIG. 4 is a functional block diagram 400 to illustrate a dynamic clustering in the CoMP communication network, in accordance with some embodiments of the present disclosure. The communication between CC and BSs deployed in the region is established using $S_1$ interface, as mentioned in 3GPP standards. Broadly, CC comprises of two modules, namely a data collector and a data analyzer as shown in FIG. 4. The data collector collects all the information related to the network deployment and parameters from one or more entities such as list of BSs, number of UEs, list of CoMP UEs associated with each BS, list of legacy UEs (non-CoMP) associated with each BS, channel state information (CSI) from the network using $S_1$ interface. The CSI comprises of various parameters such as Channel Quality Indicator (CQI), Rank Indicator (RI), Received Signal Strength Indication (RSSI) etc.

Further, the data analyzer is responsible for analyzing the data and making decisions to optimize the system performance such as throughput of the framework. Prior to analysis, the data analyzer requires pre-processing to extract desired data. Various artificial intelligence and machine learning based techniques can be part of the data analyzer for automation of the network. The desired data obtained from pre-processing is fed back to the learning module which provides the response or the appropriate decision to optimize the network performance considering the varying network parameters. The learning module contains present data as well as the previous information to learn the environment.

Furthermore, the signaling (control and data both) between a radio access node and CC is established by $S_1$ interface. All the control signaling information is sent to the CC via serving BS only. Hence, the measurement reports are forwarded to the CC from serving BS through $S_1$ interface. Based on the CSI information received, the CC selects the set of BSs which coordinate to transmit the data simultaneously to the user. This set of BSs is known as CoMP Coordinating Cluster Set (CCS). The CC forwards the data to be transmitted to all the BSs in the CCS and instructs the BSs to transmit the data to the UE.

In another embodiment, let M be the set of all memoryless policies. Following the policy M∈ M, let the average reward and cost of the system over infinite horizon be denoted by $R^M$ and $C^M$ respectively. Let R(t) and C(t) be the total reward and cost of the system incurred up to time t respectively.

$$\max R^M(t) = \frac{1}{t}\lim_{t\to\infty} E_M[R(t)] \tag{1}$$

$$C^M(t) = \frac{1}{t}\lim_{t\to\infty} E_M[C(t)] \leq C_{Max}$$

wherein, $E_M$ is the expectation operator corresponding to policy M, and $C_{Max}$ denotes the constraint on the cost of transmission from the BSs in CCS.

Further, for a fixed value of Lagrange Multiplier λ, a modified reward function is:

$$r(s^c, a; \lambda) = r(s^c, a) - \lambda c(s^c, a) \tag{2}$$

wherein, the necessary condition for optimality of $s^c$ is given by Bellman equation described below:

$$V(s^c) + \rho = \max_a \left[ r(s^c, a; \lambda) + \sum\nolimits_{S^{C'}} p\left(s^c,\ s^{c'} \quad a\right) V\left(s^{c'}\right) \right. \tag{3}$$

wherein V $(s^{c'})$ denotes the value function of state $s^C \in S^c$ and r denotes the optimal average reward. For a fixed value of λ, relational value iteration algorithm (RVIA) can be employed to solve the unconstrained maximization problem as described below:

$$V_{n+1} = \max_{a\in\mathcal{A}} \left[ r(s^c, a; \lambda) + \sum\nolimits_{S^{C'}} p\left(s^c,\ s^{c'} \quad a\right) V_n\left(s^{c'}\right) - V\left(s^{c^*}\right) \right] \tag{4}$$

wherein, $V_n(\cdot)$, which converges to $V(\cdot)$ for a large n, is an estimate of the value function after $n^{th}$ iteration and $s^c$ is an arbitrary but fixed state. Next, the aim is to determine the value of λ, which is maximizes the average expected reward, subject to the cost constraint. It is well known that for a particular value of λ=λ*, the considered problem has stationary randomized optimal policy.

At the next step 204 of the method 200, the one or more hardware processors 102 are configured by the programmed instructions to pre-process the collected information related to the network deployment and one or more parameters.

At the next step 206 of the method 200, the one or more hardware processors 102 are configured by the programmed instructions to receive the CSI from at least one user equipment at the communication network at a beginning of each time slot, wherein duration of each time slot is a predefined time interval of a time slotted arrangement. The channel state information is reported by the user equipment periodically at each time slot. The CSI includes various parameters such as Channel Quality Indicator (CQI), Rank Indicator (RI), Received Signal Strength Indication (RSSI) etc. Further, pilot signals are predefined signals that are transmitted to estimate the channel characteristics (as defined in 3GPP standards).

Figure 5:
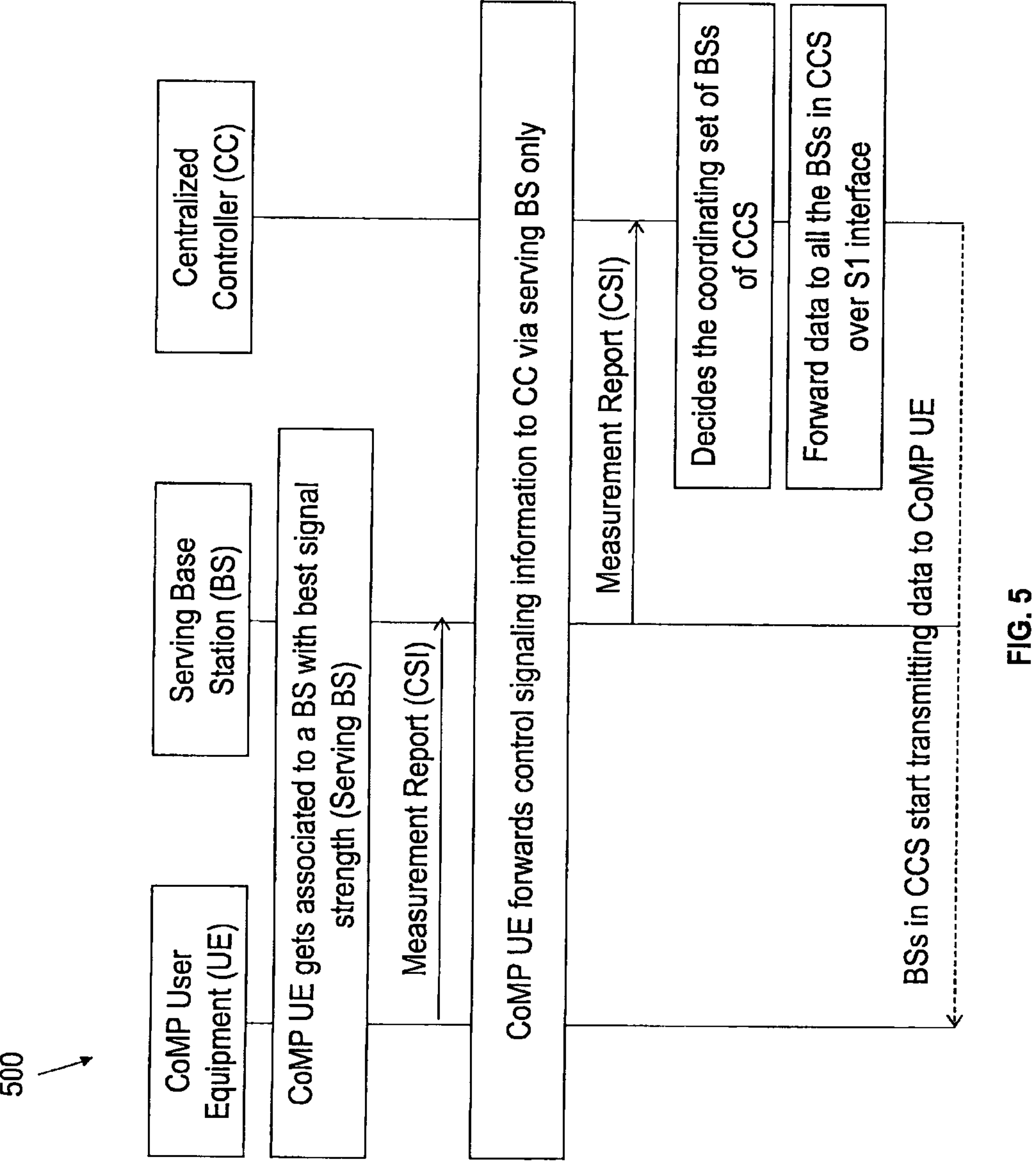
FIG. 5 is a call flow diagram to illustrate the sequence of message exchange between various entities implemented by the framework of FIG. 1, in accordance with some embodiments of the present disclosure.

FIG. 5 is a call flow diagram 500 to illustrate the sequence of message exchange between one or more entities implemented by the centralized controller 102 of FIG. 1, according to some embodiments of the present disclosure. It is to be noted that the UE connects with the BS from which it receives the best signal strength, and the BS is referred as Serving BS. This also transmits Physical Uplink Control Channel (PUCCH) defined on 3GPP standards to forward control signaling information in the network from UE. A measurement report (includes CSI) for a set of BSs is reported by UE to the serving BS. CoMP coordinating cluster is defined as a set of BSs that coordinate to transmit data to a UE.

Typically, for the purpose of association, the UE listens to downlink pilot signals from different BSs and measures their long-term average powers. Then, it gets associated with one of the BSs from which it receives the strongest average power, also referred as Serving BS. In CoMP setup, a UE reports the measurements (CSI) observed from various BSs to the serving BS, which is forwarded to a centralized decision-making entity as the centralized controller 102.

In another aspect, the centralized controller 102 decides upon the different cluster states based on the observed channel states from the BSs, and accordingly actions are taken to optimize the performance. Herein, a two timescale Q-learning technique is disclosed for dynamic clustering. Values associated with different state-action pairs, the Lagrange Multiplier (LM) and the number of iterations is initialized at the beginning. Based on channel condition, the system state is initialized. When the system is in state $s^c$, the system chooses exploration and exploitation with finite probabilities. In the exploration phase, the system selects a random action while in exploitation phase, the system chooses the action with the highest Q-value. Based on the observed reward in that state $Q(s^c, a)$ is updated along with the Lagrange Multiplier (LM). This process is thus continued for all decision epochs.

Let the Q-value, the expected long-term average reward associated with a state $s^c$ and action p $(s^c)$ as specified by the policy (p), be denoted by $Q_p(s^c, p(s^c))$. The objective is to determine an optimal policy (p*), which maximizes the Q-value associated with a cluster state as described below:

$$\pi^*(s^c) = \underset{a \in \mathcal{A}}{\operatorname{argmax}} Q_\pi(s^c, a), \forall s^c, \pi \quad (5)$$

The two-time scale signifies the fact that there are two different update sequences, namely g(n) and h(n) should satisfy the conditions specified below:

$$\sum_{n=1}^{\infty} g(n) < \infty; \sum_{n=1}^{\infty} (g(n))^2 < \infty \quad (6)$$

$$\sum_{n=1}^{\infty} h(n) < \infty; \sum_{n=1}^{\infty} (h(n))^2 < \infty \quad (7)$$

wherein value of $$h(n) = \frac{1}{n} \text{ and } g(n) = \frac{1}{n^{0.6}}$$

In yet another aspect, at every decision epoch, i.e., upon receiving the CSI at the CoMP UE from various BSs, the CC chooses an action. For every state-action pair, the network receives a reward. Based on the received reward, the CC creates the strategy to exploit or explore in the future epochs. The present disclosure exploits the actions with high reward along with a sufficient number of explorations to learn to environment. Further, an e-greedy approach is considered for exploration and exploitation. At each decision epoch, if the network is in cluster state $s^c$, the network explores with probability $e(s^c)$ and exploits the action which has the highest Q-value with probability $1-e(s^c)$. All the feasible actions in the cluster state $s^c$ are selected with equal probabilities in the exploration phase and then it reduces with sufficient number of iterations.

Referring back to FIG. 2, at the next step 208 of the method 200, the one or more hardware processors 108 are configured by the programmed instructions to determine a cluster state associated with each of the plurality of coordinated multipoint user equipment in the communication network by a Reinforcement Learning (RL) technique based on the periodically received channel state information, wherein the cluster state comprising a set of serving base stations.

At the next step 210 of the method 200, the one or more hardware processors 108 are configured by the programmed instructions to analyze the determined cluster state at the beginning of each time slot to select an action set. The action set comprises (i) removing one or more base stations from the determined cluster state, or (ii) adding one or more base stations into the cluster state, or (iii) no change in the determined cluster state. It would be appreciated if the serving base station transmits a physical uplink control channel (PUCCH) to forward control signaling information in the communication network from the user equipment.

Finally, at the last step 212 of the method 200, the one or more hardware processors 108 are configured by the programmed instructions to identify a set of base stations from the plurality of base stations based on the selected action set for the determined cluster state of the one or more coordinated multipoint user equipments.

Figure 6:
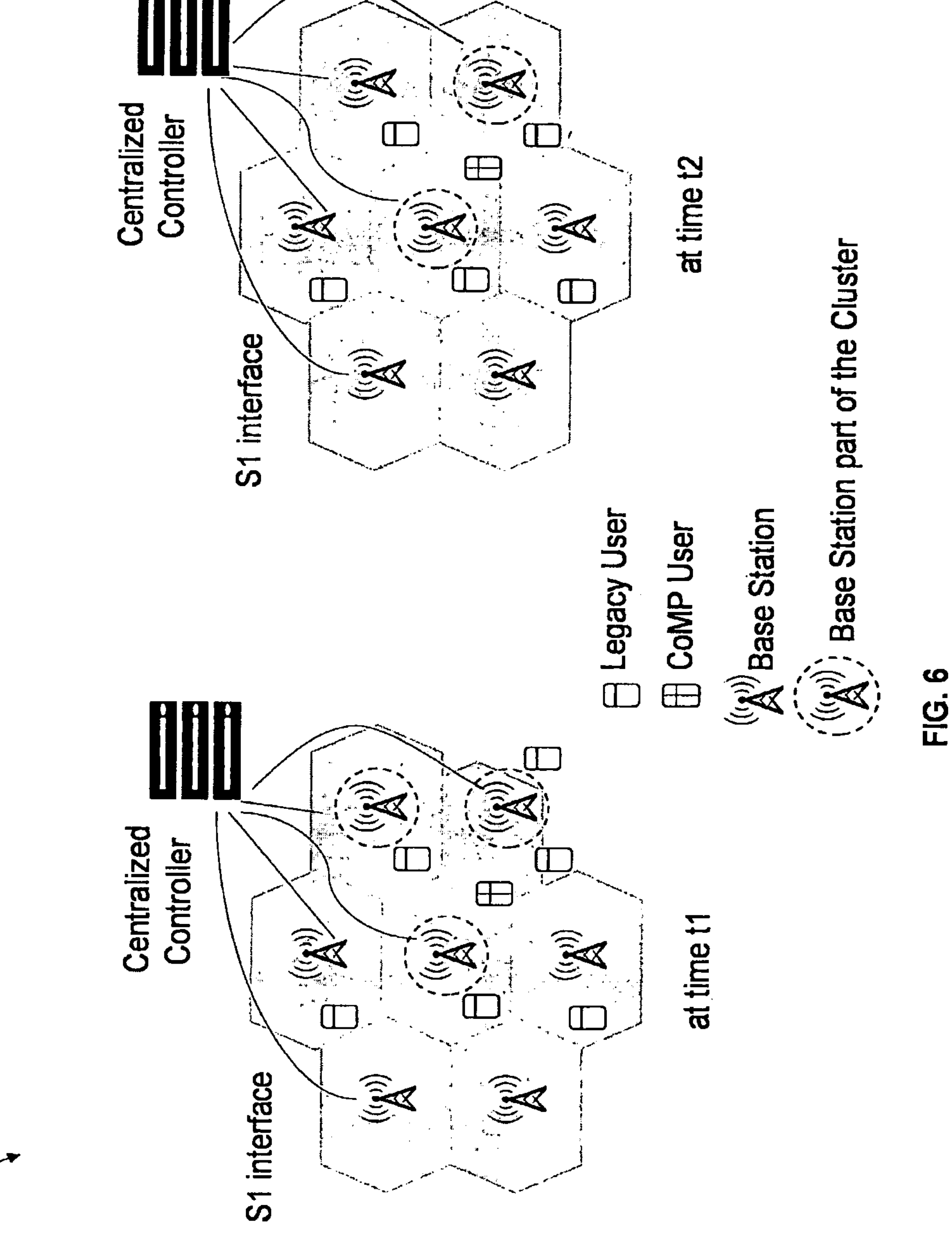
FIG. 6 is a schematic diagram to demonstrates the dynamic clustering for the CoMP, where at different time instances different set of BSs (cluster) are transmitting the data to the CoMP UE implemented by the framework of FIG. 1, according to some embodiments of the present disclosure.

FIG. 6 demonstrates the dynamic clustering for CoMP, where at different time instances different set of BSs (cluster) are transmitting the data to the CoMP UE implemented by the centralized controller 102 of FIG. 1, according to some embodiments of the present disclosure. Herein, the centralized controller decides upon the different cluster states based on the observed channel states from the BSs and accordingly actions are taken to optimize the performance.

In a simulation setting comprises a set of three BSs, legacy UEs and CoMP UE. Each legacy UE is associated with only one BS based on the signal strength observed from various BSs. Typically, legacy UE is associated with the BS from which it received the best signal strength. The CoMP UE can be served from multiple BSs simultaneously.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the problem with the dynamic clustering schemes disclosed so far is that most of the clustering schemes are applicable for a fixed cluster size, which does not capture dynamic channel conditions and cost of transmission. Therefore, embodiments herein provide a method and system for a learning based dynamic clustering of base stations for a coordinated multipoint transmission in communication networks. Herein, a centralized controller for the CoMP transmission in $5^{th}$ Generation (5G) and beyond networks is disclosed. Further, an optimal user-centric dynamic clustering technique is disclosed for the CoMP with the aim of maximizing the throughput subject to the constraint on the cost of transmission from the CoMP cluster i.e., coordinating set of Base Stations (BSs).

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs, GPUs etc.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words “comprising,” “having,” “containing,” and “including,” and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms “a,” “an,” and “the” include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term “computer-readable medium” should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method comprising:

collecting, via an input/output interface, an information related to a network deployment and one or more parameters at each time slot from a communication network;

pre-processing, via one or more hardware processors, the collected information related to the network deployment and one or more parameters;

receiving, via the one or more hardware processors, a channel state information (CSI) from at least one user equipment in the communication network at a beginning of each time slot, wherein duration of each time slot is a predefined time interval of a time slotted arrangement;

determining, via the one or more hardware processors, a cluster state associated with each of the plurality of coordinated multipoint (CoMP) user equipment in the communication network by a two-time scale Q-learning approach based on the received channel state information, wherein the cluster state comprising a set of serving base stations;

analyzing, via the one or more hardware processors, the determined cluster state at a beginning of each time slot to select an action set based on the two-time scale Q-learning approach, wherein the action set comprising one of (i) removing one or more base stations from the determined cluster state, (ii) adding one or more base stations into the cluster state, and (iii) no change in the determined cluster state; and identifying, via the one or more hardware processors, a set of base stations from the plurality of base stations based on the selected action set for the determined cluster state of the one or more coordinated multipoint user equipments.

2. The processor-implemented method of claim 1, wherein the channel state information is reported by the plurality of user equipments periodically at a predefined time interval.

3. The processor-implemented method of claim 1, wherein the serving base station transmits a physical uplink control channel (PUCCH) to forward control signaling information in the communication network from the plurality of user equipments.

4. The processor-implemented method of claim 1, wherein the plurality of user equipment is categorized into a legacy user equipment and a coordinated multipoint user equipment based on a priority of each user equipment.

5. The processor-implemented method of claim 1, wherein the one or more entities comprises one or more base stations (BSs), a plurality of user equipments (UEs), a plurality of coordinated multipoint (CoMP) user equipments (UEs) associated with each of the one or more base stations (BSs), and a plurality of legacy user equipments associated with one base station at a time.

6. The processor-implemented method of claim 1, wherein the two-time scale Q-learning approach is used to maximize the throughput subject to constraint on cost of transmission.

7. A system comprising:

an input/output interface to collect an information related to a network deployment and one or more parameters in each time slot from a communication network;

a memory in communication with the one or more hardware processors, wherein the one or more hardware processors are configured to execute programmed instructions stored in the memory to;

pre-process the collected information related to the network deployment and one or more parameters;

receive a channel state information (CSI) from at least one user equipment at the communication network at a beginning of each time slot, wherein duration of each time slot is a predefined time interval of a time slotted arrangement;

determine a cluster state associated with each of the plurality of coordinated multipoint user equipment in the communication network by a two-time scale Q-learning approach based on the periodically received channel state information, wherein the cluster state comprising a set of serving base stations;

analyze the determined cluster state at a beginning of each time slot to select an action set based on the two-time scale Q-learning approach, wherein the action set comprising one of (i) removing one or more base stations from the determined cluster state, (ii) adding one or more base stations into the cluster state, and (iii) no change in the determined cluster state; and identify a set of base stations from the plurality of base stations based on the selected action set for the determined cluster state of the one or more coordinated multipoint user equipments.

8. The system of claim 7, wherein the channel state information is reported by the plurality of user equipments periodically at a predefined time interval.

9. The system of claim 7, wherein the serving base station transmits a physical uplink control channel (PUCCH) to forward control signaling information in the communication network from the plurality of user equipments.

10. The system of claim 7, wherein the plurality of user equipment is categorized into a legacy user equipment and a coordinated multipoint user equipment based on a priority of each user equipment.

11. The system of claim 7, wherein the one or more entities comprises one or more base stations (BSs), a plurality of user equipments (UEs), a plurality of coordinated multipoint user equipments associated with each of the one or more base stations (BSs), and a plurality of legacy user equipments associated with one base station at a time.

12. The system of claim 7, wherein the two-time scale Q-learning approach is used to maximize the throughput subject to constraint on cost of transmission.

13. One or more non-transitory machine-readable information storage mediums comprising one or more instructions which when executed by one or more hardware processors cause:

collecting, via an input/output interface, an information related to a network deployment and one or more parameters at each time slot from a communication network;

pre-processing the collected information related to the network deployment and one or more parameters;

receiving a channel state information (CSI) from at least one user equipment in the communication network at a beginning of each time slot, wherein duration of each time slot is a predefined time interval of a time slotted arrangement;

determining a cluster state associated with each of the plurality of coordinated multipoint (CoMP) user equipment in the communication network by a two-time scale Q-learning approach based on the received channel state information, wherein the cluster state comprising a set of serving base stations;

analyzing the determined cluster state at a beginning of each time slot to select an action set based on the two-time scale Q-learning approach, wherein the action set comprising one of (i) removing one or more base stations from the determined cluster state, (ii) adding one or more base stations into the cluster state, and (iii) no change in the determined cluster state; and identifying a set of base stations from the plurality of base stations based on the selected action set for the determined cluster state of the one or more coordinated multipoint user equipments.

14. The one or more non-transitory machine-readable information storage mediums of claim 13, wherein the channel state information is reported by the plurality of user equipments periodically at a predefined time interval.

15. The one or more non-transitory machine-readable information storage mediums of claim 13, wherein the serving base station transmits a physical uplink control channel (PUCCH) to forward control signaling information in the communication network from the plurality of user equipments.

16. The one or more non-transitory machine-readable information storage mediums of claim 13, wherein the plurality of user equipments are categorized into a legacy user equipment and a coordinated multipoint user equipment based on a priority of each user equipment.

17. The one or more non-transitory machine-readable information storage mediums of claim 13, wherein the one or more entities comprises one or more base stations (BSs), a plurality of user equipments (UEs), a plurality of coordinated multipoint (CoMP) user equipments (UEs) associated with each of the one or more base stations (BSs), and a plurality of legacy user equipments associated with one base station at a time.

18. The one or more non-transitory machine-readable information storage mediums of claim 13, wherein the two-time scale Q-learning approach is used to maximize the throughput subject to constraint on cost of transmission.

* * * * *